United States Patent [19]
Boppana et al.

[11] Patent Number: 5,265,985
[45] Date of Patent: Nov. 30, 1993

[54] METAL CUTTING INSERT

[75] Inventors: Sreedwaraka P. Boppana, Troy; John Patterson, Hazel Park; Yefim Val, Troy, all of Mich.

[73] Assignee: Valenite Inc., Troy, Mich.

[21] Appl. No.: 986,202

[22] Filed: Dec. 7, 1992

[51] Int. Cl.⁵ .................... B23B 27/22; B23O 5/20
[52] U.S. Cl. .................... 407/114; D15/139
[58] Field of Search ........... 407/113, 114, 115, 116; D15/139

[56] References Cited

U.S. PATENT DOCUMENTS

| | | | |
|---|---|---|---|
| D. 305,663 | 1/1990 | Niebauer | D15/139 |
| D. 324,690 | 3/1992 | Takahashi et al. | D15/139 |
| 3,751,782 | 8/1973 | Fruish | 407/114 |
| 4,273,480 | 6/1981 | Shirai et al. | 407/114 |
| 4,318,644 | 3/1982 | Seidel | 407/114 |
| 4,479,744 | 10/1984 | Stricker | 407/114 |
| 4,626,140 | 12/1986 | Zweekly et al. | 407/114 |
| 5,044,840 | 9/1991 | Fouquer et al. | 407/114 |
| 5,074,720 | 12/1991 | Loqvist et al. | 407/114 |
| 5,122,017 | 6/1992 | Niebauer | 407/114 |

*Primary Examiner*—William E. Terrell
*Attorney, Agent, or Firm*—Bill C. Panagos

[57] ABSTRACT

A polygonal lay down indexable insert having radial projection is described. The insert reduces the force required to machine by reducing the friction forces encountered in machining operations.

8 Claims, 2 Drawing Sheets

METAL CUTTING INSERT

BACKGROUND OF THE INVENTION

1. Field of the Invention

The present invention relates to metal cutting inserts and chip control geometry on such inserts.

The present invention further relates to a polygonal, lay down, indexable cutting insert which controls chips formed during cutting operations.

SUMMARY OF THE INVENTION

The present invention is a polygonal, lay down indexable cutting insert. The insert provides for excellent chip control at moderate to high cutting speeds at low rates of feed and depth of cuts. The insert has top and bottom planar surfaces which are substantially parallel to each other and a side wall extending substantially unbroken therebetween to define a body. The side wall is comprised of side flanks, which extend from corner to corner of the insert. At least one corner serves as a nose portion of the insert.

A centrally located aperture extends through the body from the top to bottom surface of the insert. A cutting edge is defined by the intersection of the side wall and the top or bottom surface. A descending land surface extends rearward of said cutting edge and a chip groove extends rearward of said descending surface. A plurality of raised, radial projections extend from the central aperture to the chip groove. Each radial projection is located equidistant from the adjacent radial projection and each radial projection has an incident angle surface where it meets the chip groove.

Preferably, the nose portions are located on diametrically opposite sides of the central aperture. The radial projections at the nose portion are configured to have a rounded head portion extending forward of two rounded shoulder portions and the chip groove at the nose portions is radiused.

DETAILED DESCRIPTION OF THE PREFERRED EMBODIMENT

Figure 1:
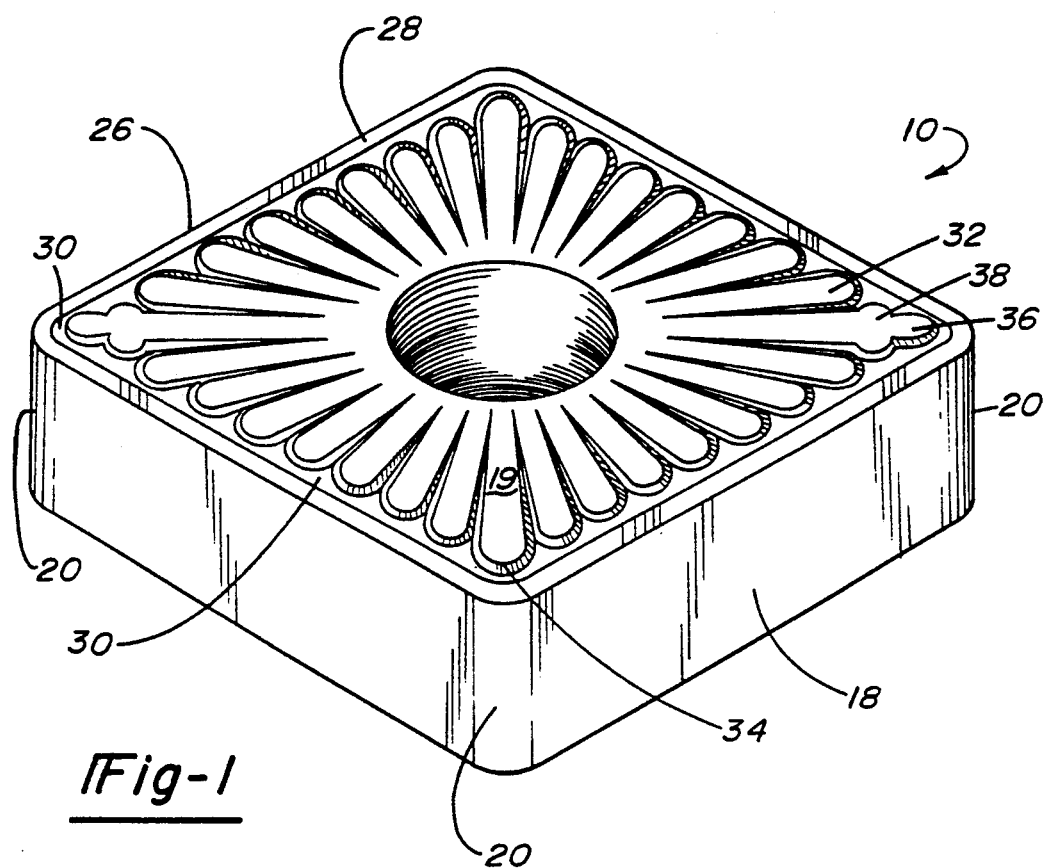
FIG. 1 is a perspective top view of the insert.
Figure 2:
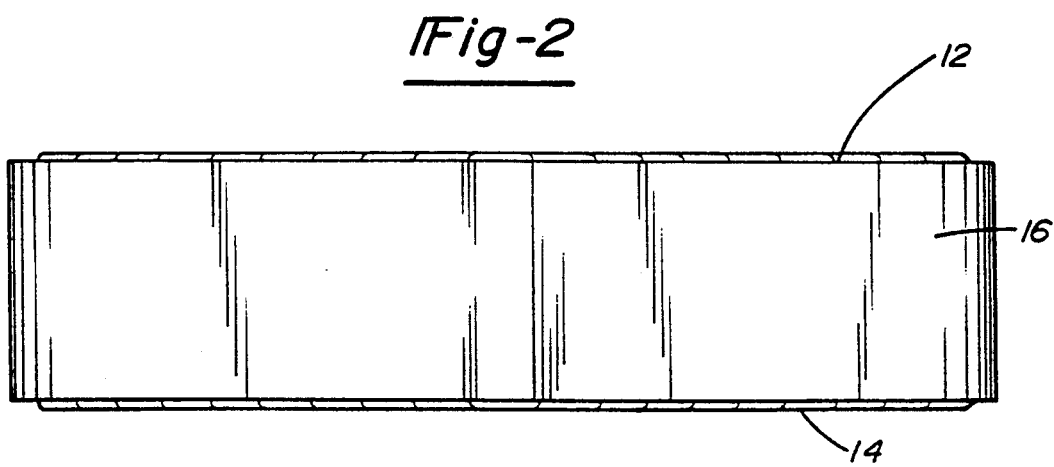
FIG. 2 is an on side view of the insert.

Turning now to the drawings, wherein like numeral refer to like structures, and in particular to FIGS. 1 and 2, polygonal lay down indexable insert 10, is comprised of a top planar surface 12, a bottom planar surface 14. These surfaces are substantially parallel to each other and are separated by sidewall 16 extending substantially unbroken therebetween to form the body 19 of the insert. The sidewall is comprised of side flanks 18 which extend from each corner 20 to the adjacent corner 20. At least one corner is designated as a nose portion 22, and, as is shown in the rhombus shaped insert of FIG. 3, the nose portions are on diametrically opposite sides of the central aperture 24. The aperture extends from the top through the body to the bottom surface.

Figure 3:
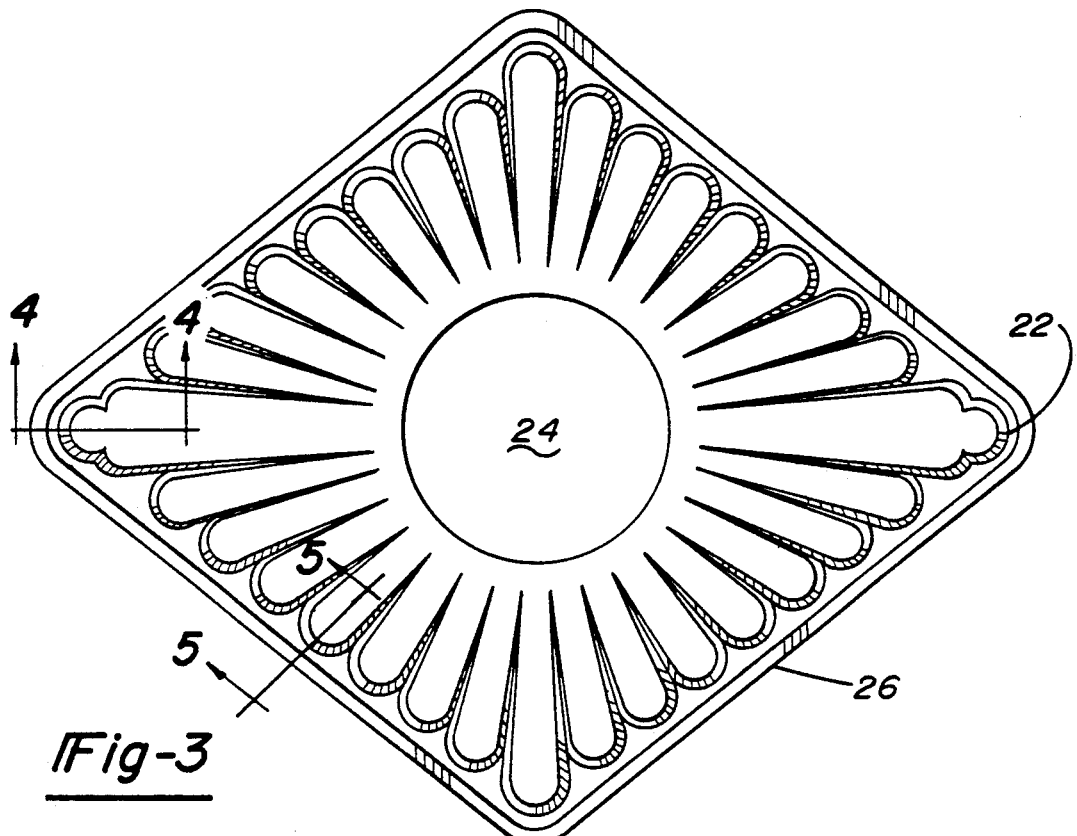
FIG. 3 is a top plan view of the insert.
Figure 4:
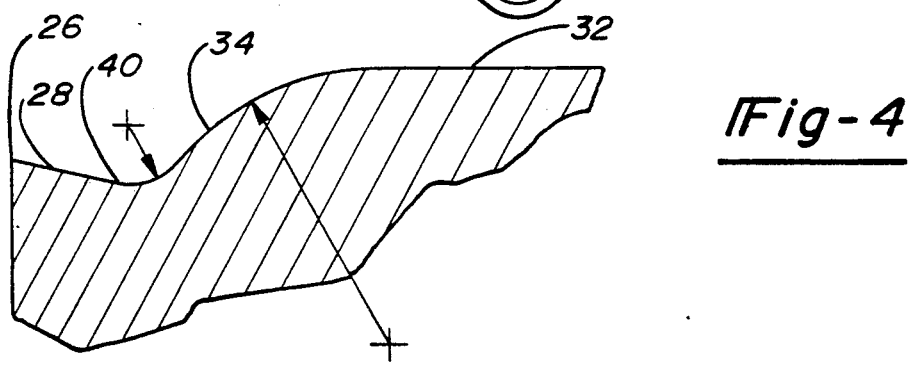
FIG. 4 is a sectional view of the insert taken along line 4—4 of FIG. 3.
Figure 5:
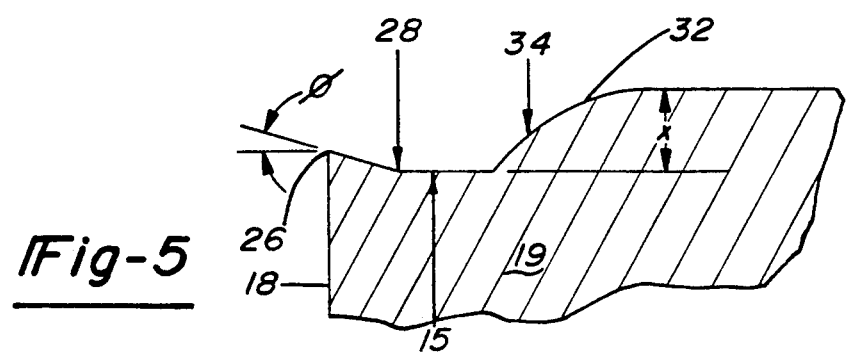
FIG. 5 is a sectional view of the insert taken along line 2—2 of FIG. 3.

A cutting edge 26 is formed by the intersection of the side wall and the top and/or bottom surface. Rearward of the cutting edge, there is provided a descending land surface. The land descends from the cutting edge at some angle "$\phi$", and preferably at about a 17 degree angle. Rearward of the descending land surface is a chip groove, which has a planar land bottom 15 along the flank as seen in FIG. 5 and a radiused configuration 40 at the nose portion as seen in FIG. 4. FIG. 5 is taken along line 2—2 of FIG. 3, and FIG. 4 is taken along line 4—4 of FIG. 3. The descending land surface has a width of about 0.008 to 0.010 inches and is preferably 0.008 inches in width.

Located on the top and bottom surface are radial projections 32 which are raised above the cutting edge and extend from the central aperture to the chip groove. The projections are raised from the chip groove bottom a distance "X", and preferably about 0.010 to 0.012 inches. The radial projections meet the chip groove at incident radius angle surface 34. The incident radius surface is radiused at about 0.030 inches. Because the radial projections are raised, the chip encounters strain and there is reduced friction between the insert and the metal cutting because the chip flows over the radial projections. Coolant can flow between the projections, thereby cooling the insert and contributing to insert life.

At nose portion 22, as seen in FIG. 4, the chip groove is radiused, preferably at about 0.005 inches. The radial projections at the nose portions are configured so as to have a rounded head portion 36 extending beyond rounded shoulder portions 38. These head and shoulder projections direct the flow of chips to achieve good chip control at moderate to high cutting speeds at the low range of feeds and depth of cuts.

Those skilled in the art will recognize that many variations are possible without departing from the scope and spirit of the invention.

We claim:

1. A polygonal, lay down indexable cutting insert, comprising:

a top and bottom surface substantially parallel to each other and a sidewall running substantially unbroken therebetween to define a body; said sidewall comprised of side flank portions which extend from corner to corner of the insert; at least one of said corners defining a nose portion; a centrally located aperture extending through the body from the top to the bottom surface; a cutting edge defined by the intersection of said sidewall with said top or bottom surface; a descending land surface extending rearward of said cutting edge; a chip groove surface extending rearward of said descending land surface; said chip groove terminating in a planar land surface along the flanks of the insert and radiused at the corners of the insert; a plurality of raised, radial projections along the top and bottom surfaces of the insert; said radial projections extending from said central aperture to said chip groove; each said radial projection being located equidistant from the adjacent radial projection; each said radial projection having an incident radius angle surface where it meets the chip groove; the radial projections at the nose portions of the insert having a rounded head projecting from rounded shoulder portions.

2. The insert of claim 1, wherein said insert is a rhombus.

3. The insert of claim 1, wherein said nose portions are located on diametrically opposite sides of the central aperture.

4. The insert of claim 1, wherein said radial projections are raised from about 0.010 to .012 inches from the chip groove.

5. The insert of claim 1, wherein said descending land surface has a descending angle of about 17 degrees.

6. The insert of claim 1, wherein the chip groove at the nose portions is radiused at about 0.005 inches.

7. The insert of claim 1, wherein said incident radius surface is about 0.030 inches.

8. The insert of claim 1, wherein said descending land surface has a width of about 0.008 to 0.010 inches.

* * * * *